(No Model.) 2 Sheets—Sheet 1.

T. PUETZ, Jr.
AUTOMATIC STOP.

No. 330,851. Patented Nov. 17, 1885.

Attest:
Walter Allen
F. A. Hopkins

Inventor:
Tillman Puetz Jr.
By Knight Bros
attys.

(No Model.)  
T. PUETZ, Jr.  
AUTOMATIC STOP.

No. 330,851. Patented Nov. 17, 1885.

Attest:
Walter Allen
F. A. Hopkins

Inventor:
Tillman Puetz, Jr.
By Knight Bros
Attys.

UNITED STATES PATENT OFFICE.

TILLMAN PUETZ, JR., OF ST. LOUIS, MISSOURI.

AUTOMATIC STOP.

SPECIFICATION forming part of Letters Patent No. 330,851, dated November 17, 1885.

Application filed October 13, 1885. Serial No. 179,747. (No model.)

*To all whom it may concern:*

Be it known that I, TILLMAN PUETZ, Jr., of the city of St. Louis, in the State of Missouri, have invented certain new and useful Improvements in Automatic Stops, of which the following is a full, clear, and exact description, reference being had to the accompanying drawings, forming part of this specification, in which—

Figure 1:
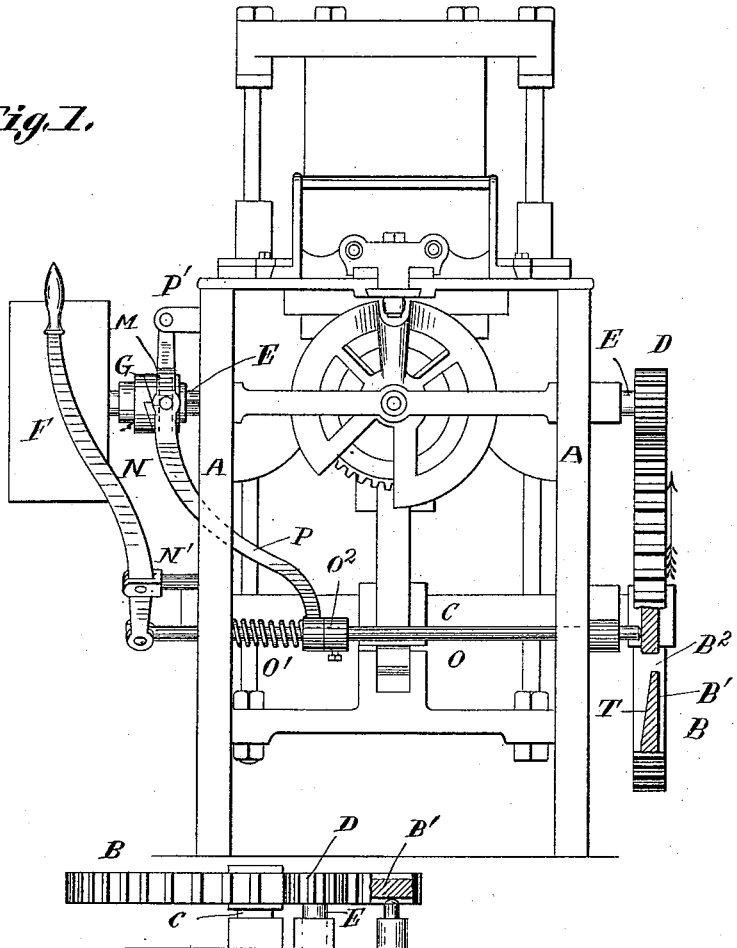
Figure 2:
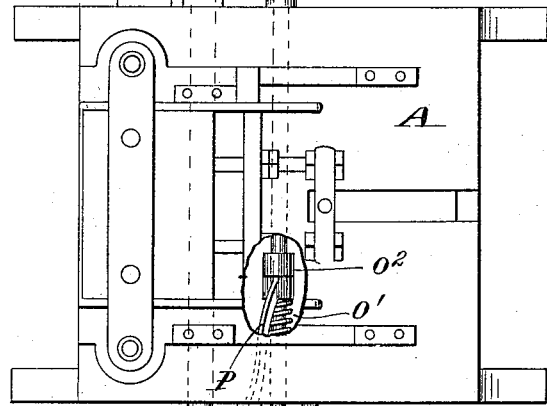
Figure 3:
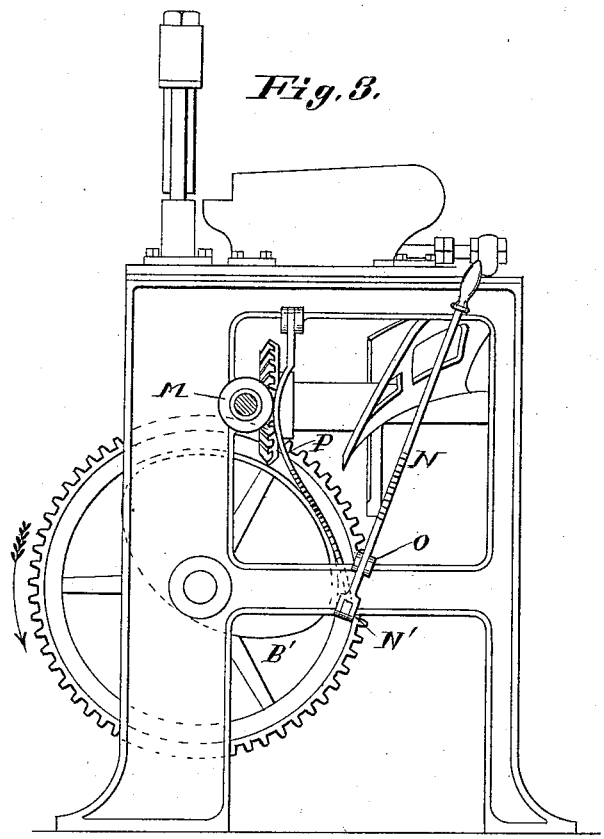
Figure 4:
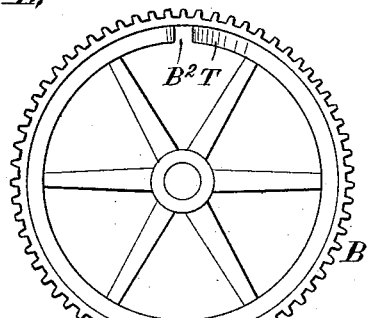
Figure 5:
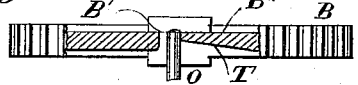

Figure 1 is an end view of a machine provided with my improved stop. Fig. 2 is a top view of the same. Fig. 3 is a side elevation, with the main shaft in section, taken on line 3 3, Fig. 2. Fig. 4 is an inside view of the cog-wheel removed. Fig. 5 is an end view of same part in section.

My invention relates to a stop intended more particularly for use on plug-tobacco machines, but which may be used on other machines, and is similar to that shown and described, but not claimed, in my application No. 150,843, filed December 20, 1884; and my invention consists in features of novelty hereinafter fully described, and pointed out in the claims.

Referring to the drawings, A represents the frame of the machine, and B a cog-wheel on an operating cam-shaft, C, and engaged by a pinion, D, on the main driving-shaft E, provided with a driving-pulley, F, and having a collar or hub, G, rigidly secured to it and notched to receive a sliding clutch, M, keyed to or otherwise made to turn with the shaft, and operated by a lever, N, and arm or bar P. The lever is fulcrumed at N' to the frame of the machine, and has secured or connected to it a rod, O, that extends across the machine and bears against a flange, B', of the wheel B, provided with a perforation or opening, $B^2$, to receive the end of the rod. The arm or bar P is pivoted at P' to the frame of the machine and connected to the clutch M. The other end of the arm surrounds the rod O, between a collar, $O^2$, and a spiral spring, O'. When the clutch is forced into engagement with the collar G by the lever through means of the described connection, the end of the rod is pulled out of the perforation $B^2$, and the lever is then released, allowing the end of the rod to be pressed against the flange of the cog-wheel by the spring O', surrounding the rod between one side of the frame A and the collar or projection $O^2$ on the rod. When the cog-wheel has made one revolution, the end of the rod will enter the perforation $B^2$ simultaneous with the clutch being disengaged from the collar G by the spring O', thus forming a positive lock to the machine at each revolution of the wheel. When the machine is to be started again, the free end of the lever is forced toward the machine, which causes the clutch to engage the collar G, and at the same time withdraws the end of the rod O from the perforation $B^2$ in the cog-wheel, to permit the wheel to turn and the machine to start; and to avoid danger of the pin not being withdrawn from the hole as soon as the clutch first engages the collar (in case of which a breakage might occur) I bevel off the flange B' of the cog-wheel toward the opening, as shown at T, Figs. 1, 4, and 5. There is another advantage in this bevel, and that is this: The lever does not have to be forced the entire distance required to fully engage the clutch with the collar, but only sufficient to partly engage it, and then the incline T, pressing against the end of the rod O, will move it (the clutch) the rest of the way.

This device can be applied to any machine having an intermittent movement, and forms a positive and safe automatic stop.

I claim as my invention—

1. In combination with a machine having a sliding clutch and a gear-wheel provided with a perforation, $B^2$, an automatic stop consisting of spring-rod arranged to enter the perforation in the gear-wheel and connected to the clutch, and a lever for operating the rod, substantially as set forth.

2. In combination with a machine having a sliding clutch and a gear-wheel provided with a perforation, $B^2$, an automatic stop consisting of a spring-rod arranged to enter the perforation in the gear-wheel and connected to the clutch by a pivoted arm or bar, and a lever for operating the rod, substantially as set forth.

3. In combination with a machine having a sliding clutch and a gear-wheel provided with a flange, B, having a perforation, $B^2$, and a taper, T, an automatic stop consisting of a spring-rod arranged to enter the perforation B² in the flange of the gear-wheel and connected to the clutch, and a lever for operating the rod, as set forth.

4. In combination with the drive-shaft, cam-shaft, sliding clutch, and collar on the drive-shaft, and cog-wheel on the cam-shaft having a perforated flange, the lever for operating the clutch, and rod connected to the lever and adapted to enter the perforation in the cog-wheel, substantially as shown and described, for the purpose set forth.

5. In combination with the drive-shaft, cam-shaft, sliding clutch, and collar on the drive-shaft, and cog-wheel on the cam-shaft having a perforated flange, the lever for operating the clutch, and rod connected to the lever and adapted to be automatically engaged with the perforation in the cog-wheel by means of the spring O', substantially as shown and described, for the purpose set forth.

TILLMAN PUETZ, JR.

Witnesses:
OCTAVIUS KNIGHT,
GEO. H. KNIGHT.